United States Patent
Lebel

(10) Patent No.: US 11,506,383 B2
(45) Date of Patent: Nov. 22, 2022

(54) COMBUSTOR LINER AND METHOD OF OPERATING SAME

(71) Applicant: PRATT & WHITNEY CANADA CORP., Longueuil (CA)

(72) Inventor: Larry Lebel, Verchères (CA)

(73) Assignee: PRATT & WHITNEY CANADA CORP, Longueuil (CA)

( * ) Notice: Subject to any disclaimer, the term of this patent is extended or adjusted under 35 U.S.C. 154(b) by 0 days.

(21) Appl. No.: 17/066,858

(22) Filed: Oct. 9, 2020

(65) Prior Publication Data

US 2022/0113028 A1    Apr. 14, 2022

(51) Int. Cl.
F23R 3/00        (2006.01)

(52) U.S. Cl.
CPC ........... F23R 3/007 (2013.01); F23R 3/002 (2013.01)

(58) Field of Classification Search
CPC ......... F23R 3/002; F23R 3/007; C03C 13/006
USPC ...................................................... 428/293.4
See application file for complete search history.

(56) References Cited

U.S. PATENT DOCUMENTS

| | | | | |
|---|---|---|---|---|
| 2,919,549 A | * | 1/1960 | Haworth | F02K 1/822 60/753 |
| 5,474,306 A | * | 12/1995 | Bagepalli | F01D 9/023 277/355 |
| 5,605,046 A | * | 2/1997 | Liang | F23R 3/002 60/752 |
| 6,767,659 B1 | * | 7/2004 | Campbell | C04B 41/52 428/701 |
| 10,807,912 B1 | * | 10/2020 | Zhu | F01D 5/284 |
| 2006/0019087 A1 | * | 1/2006 | Mazzola | C04B 28/34 428/323 |
| 2006/0024528 A1 | * | 2/2006 | Strangman | C04B 41/52 428/701 |
| 2006/0211564 A1 | | 9/2006 | Merrill | |
| 2007/0289307 A1 | * | 12/2007 | Grote | C04B 35/1015 60/753 |
| 2009/0077975 A1 | * | 3/2009 | Scholz | F27D 1/0006 60/752 |
| 2009/0260364 A1 | * | 10/2009 | Keller | F01D 9/023 60/753 |
| 2010/0015394 A1 | | 1/2010 | Morrison et al. | |
| 2010/0272953 A1 | * | 10/2010 | Yankowich | F23R 3/06 428/138 |
| 2012/0148794 A1 | * | 6/2012 | Keller | C04B 37/025 428/117 |
| 2012/0164430 A1 | * | 6/2012 | Thebault | C04B 41/87 427/258 |

(Continued)

FOREIGN PATENT DOCUMENTS

EP          3480011          5/2019
WO    WO-2017146726 A1 *    8/2017    ............ B32B 18/00

Primary Examiner — Ehud Gartenberg
Assistant Examiner — Henry Ng
(74) Attorney, Agent, or Firm — Norton Rose Fulbright Canada LLP

(57) ABSTRACT

The gas turbine combustor liner can delimit a combustion chamber, and have at least one monolithic ceramic block having a first face exposed to the combustion chamber and a second face opposite the first face, and a 3D fabric of ceramic fibers partially embedded inside the monolithic ceramic block, and partially extending outside the second face of the monolithic ceramic block, away from the combustion chamber.

20 Claims, 8 Drawing Sheets

(56) References Cited

U.S. PATENT DOCUMENTS

| | | | |
|---|---|---|---|
| 2012/0183788 A1* | 7/2012 | Corman | C04B 35/62857 |
| | | | 428/446 |
| 2014/0157783 A1 | 6/2014 | Kidder et al. | |
| 2018/0292090 A1* | 10/2018 | Dyer | F23R 3/60 |
| 2018/0371923 A1* | 12/2018 | Johnson | F23R 3/007 |
| 2019/0071983 A1* | 3/2019 | Kirby | F01D 5/282 |
| 2019/0353345 A1* | 11/2019 | Folkers | F23R 3/286 |
| 2021/0246081 A1* | 8/2021 | Thomas | F01D 5/284 |

* cited by examiner

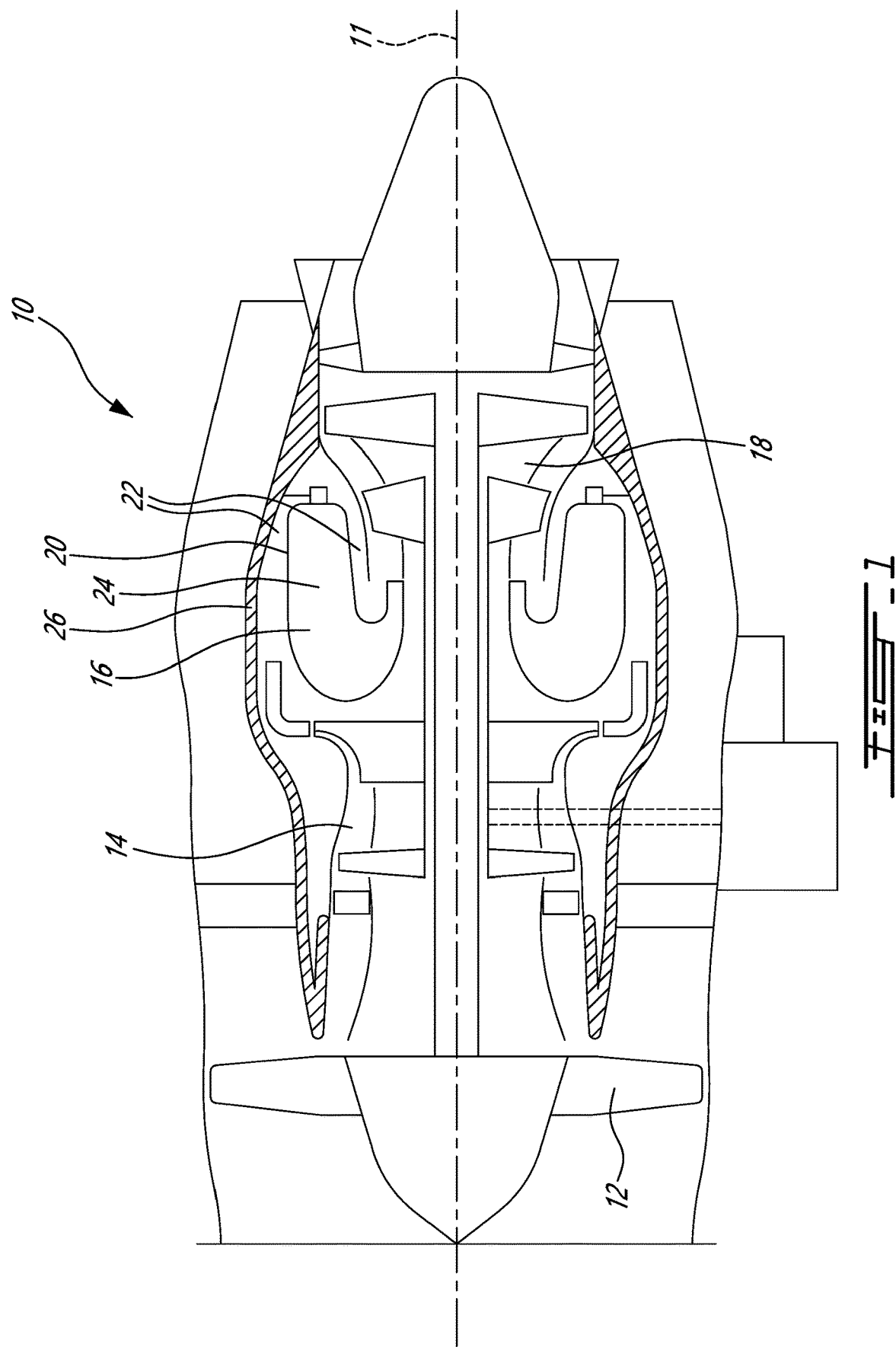

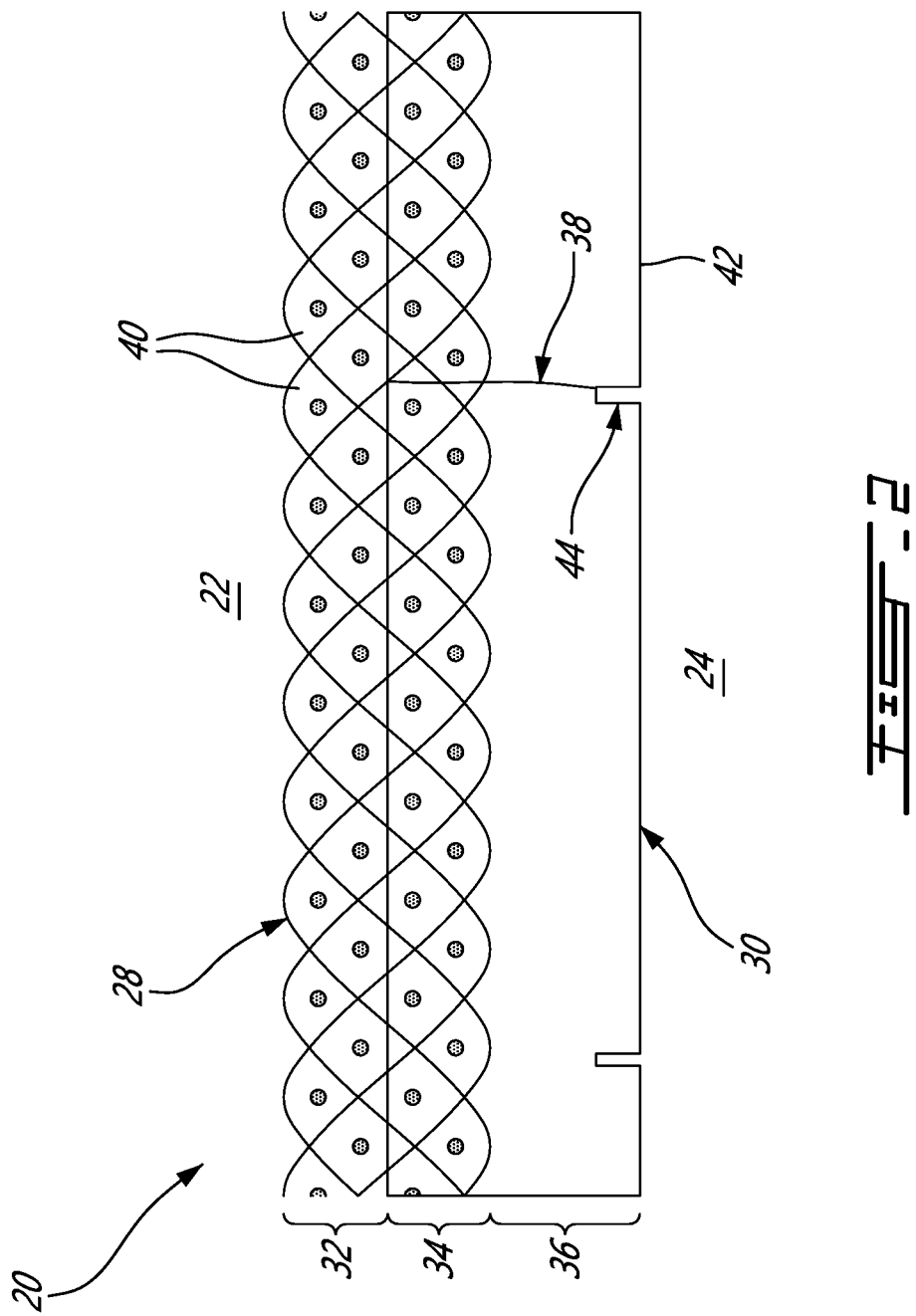

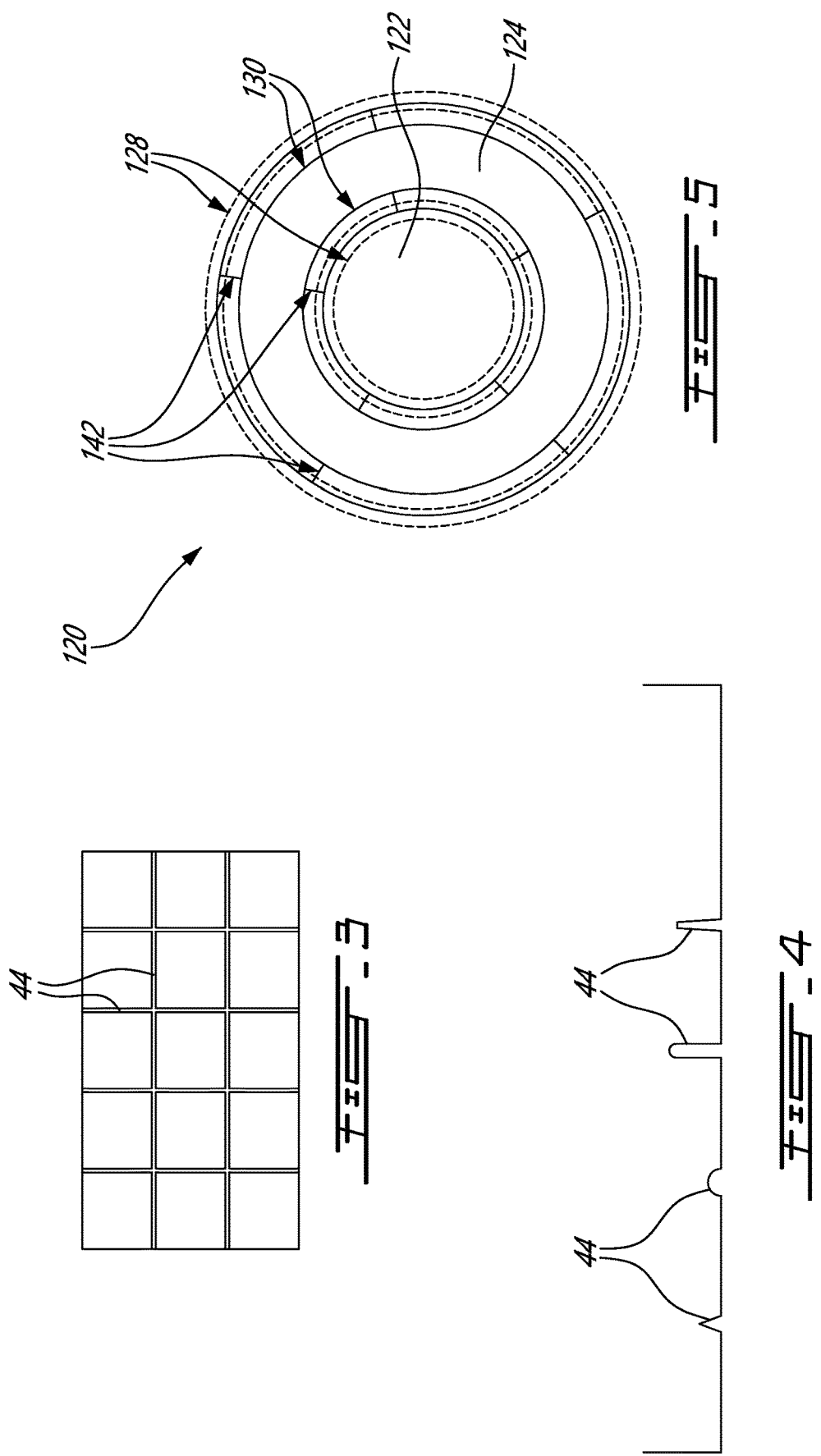

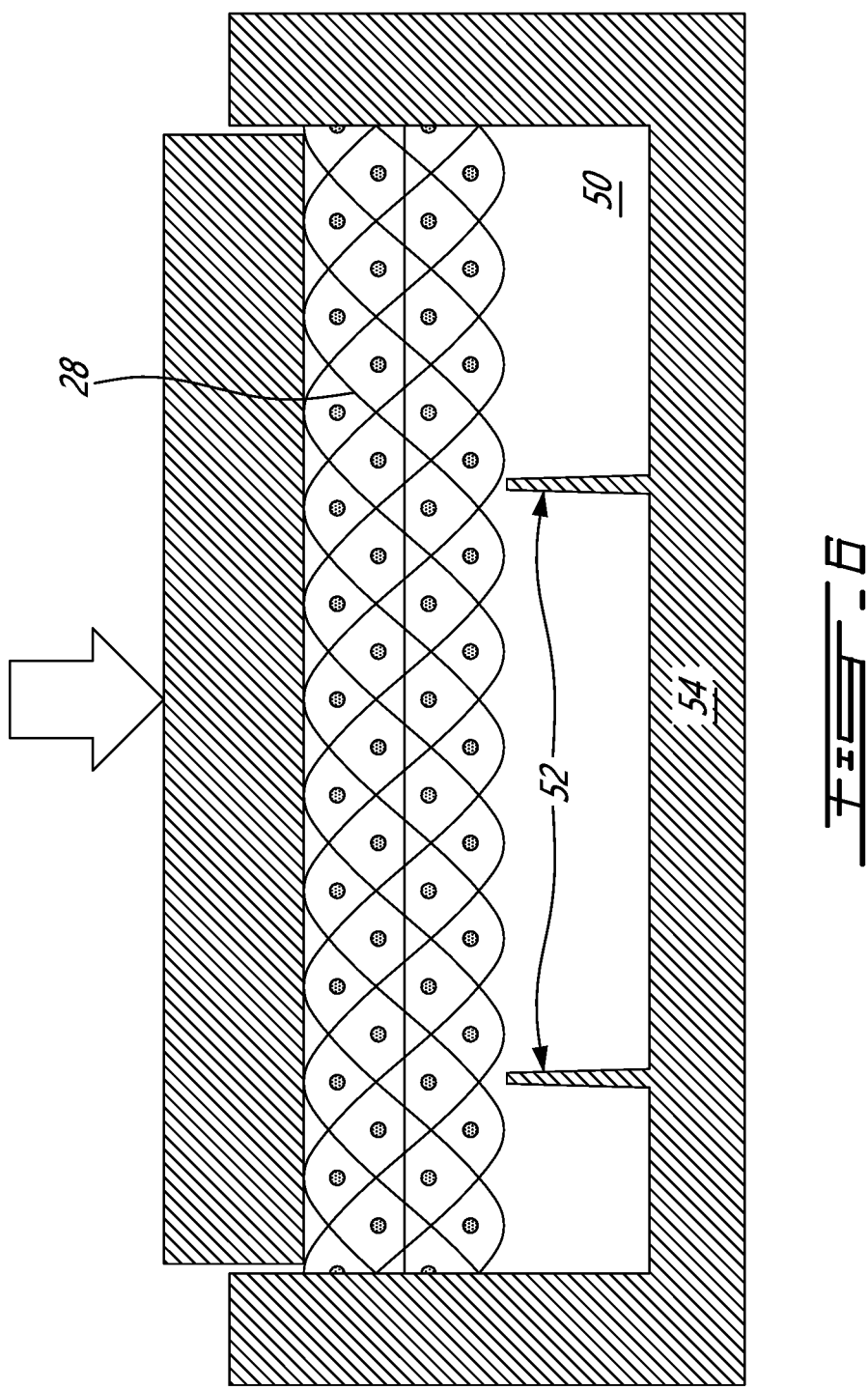

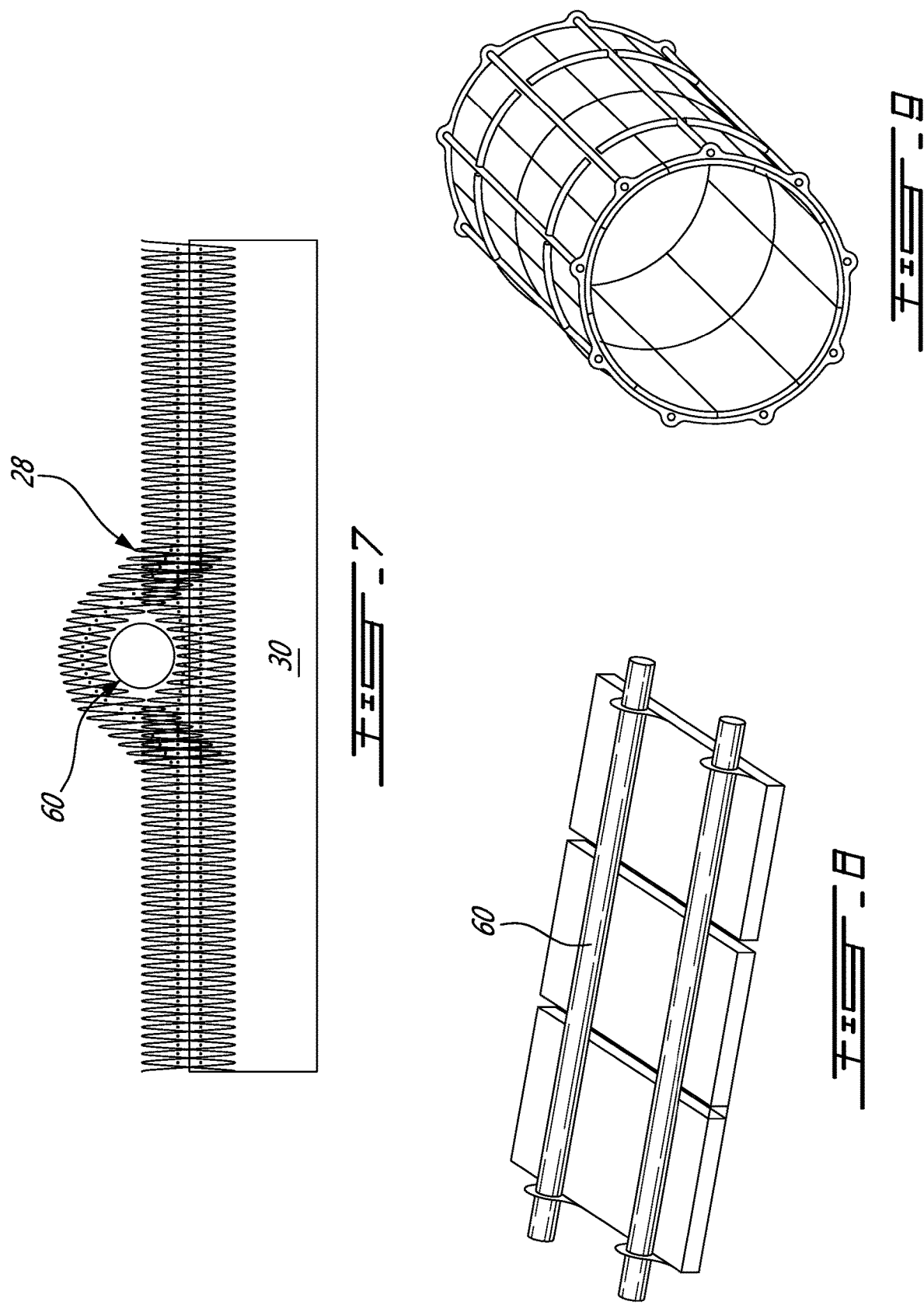

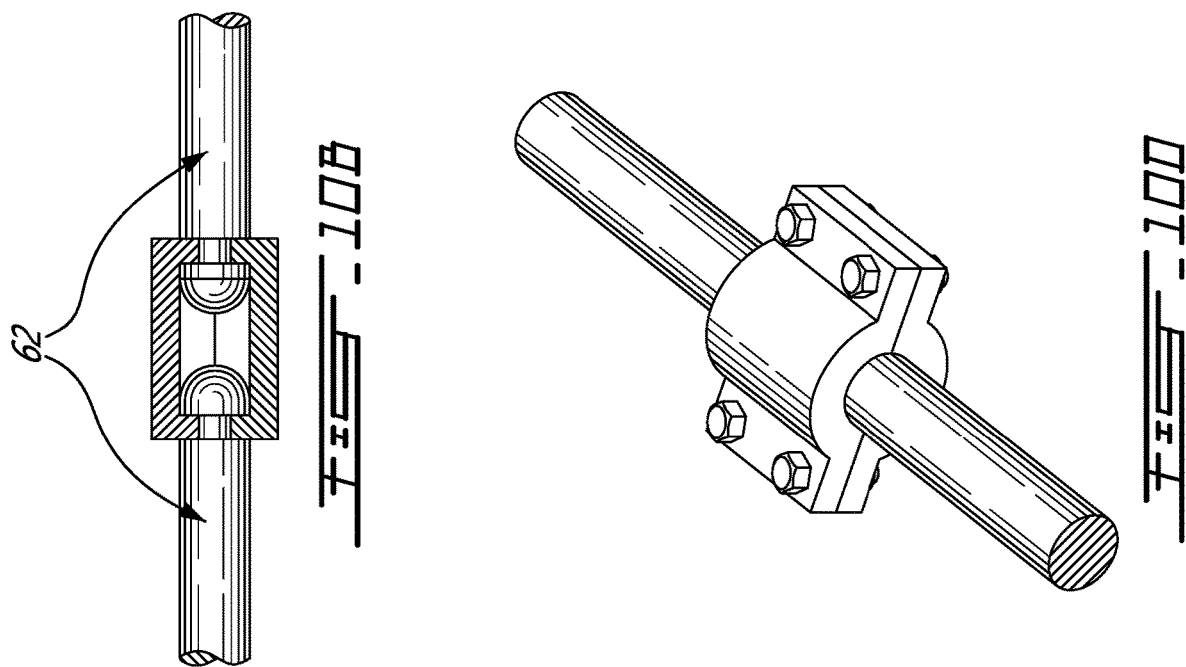
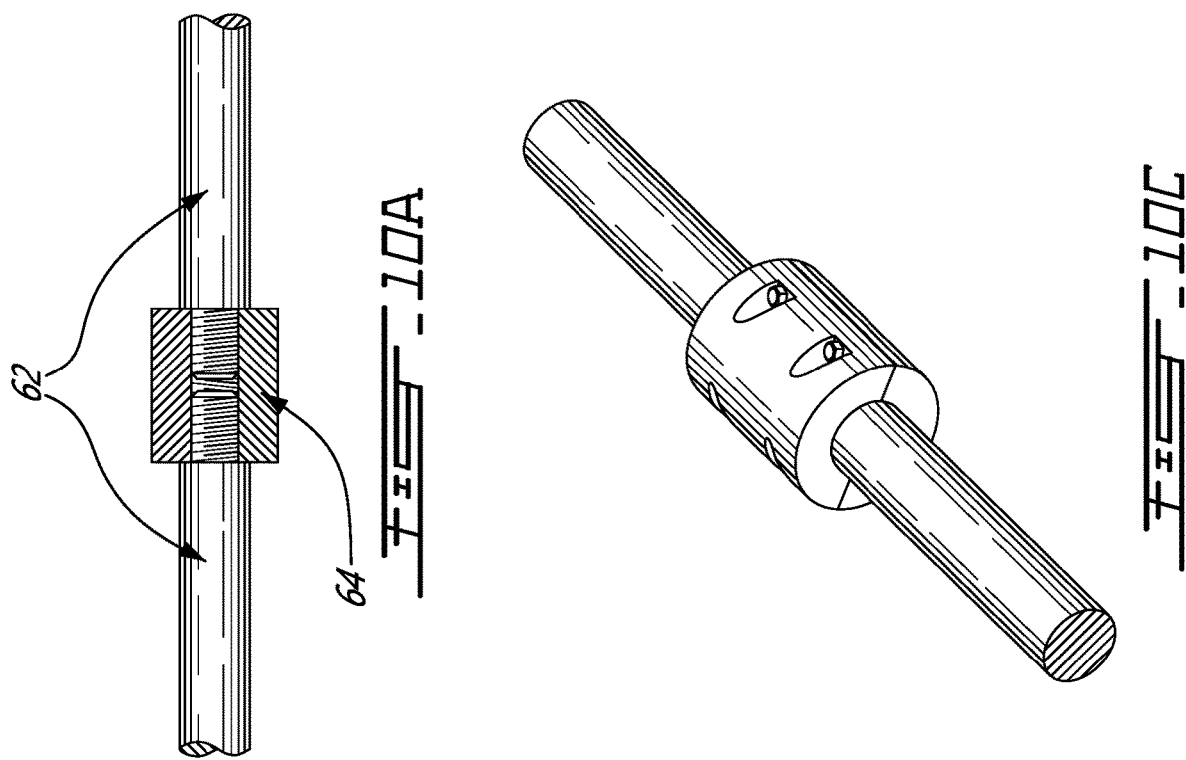

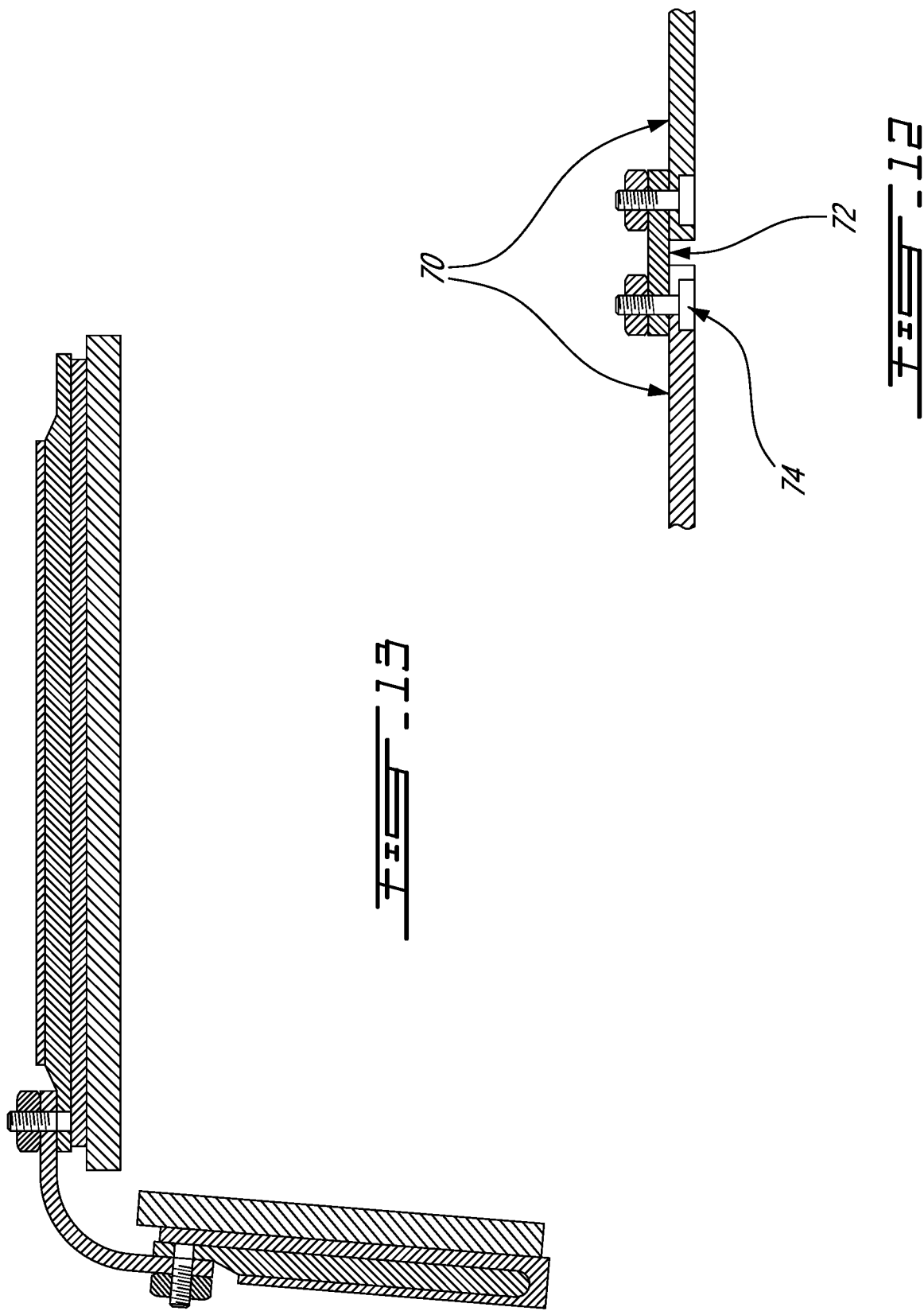

COMBUSTOR LINER AND METHOD OF OPERATING SAME

TECHNICAL FIELD

The application relates generally to gas turbine engines and, more particularly, to combustors thereof.

BACKGROUND OF THE ART

It is frequent for gas turbine engines to have a combustor which includes a liner positioned within a casing, the liner being apertured, in a manner for compressed air to travel first between the casing and the liner, and then into the liner through the apertures, where the combustion ultimately occurs. In such a context, for example, the liner is designed and built to withstand extended high temperature cycles. While several strategies existed to achieve this objective, there always remains room for improvement.

SUMMARY

In one aspect, there is provided a gas turbine combustor liner delimiting a combustion chamber, the combustor liner comprising: at least one monolithic ceramic block having a first face exposed to the combustion chamber and a second face opposite the first face, and a 3D fabric of ceramic fibers partially embedded inside the monolithic ceramic block, and partially extending outside the second face of the monolithic ceramic block, away from the combustion chamber.

In another aspect, there is provided a gas turbine engine comprising, in serial flow communication, a compressor section, a combustor section, and a turbine section, the combustor section comprising a combustor liner having: at least one monolithic ceramic block having a first face exposed to a combustion chamber and a second face opposite the first face, and a 3D fabric of ceramic fibers partially embedded inside the monolithic ceramic block, and partially extending outside the second face of the monolithic ceramic block, away from the combustion chamber; the combustor section further comprising a cooling flow path extending alongside the second face.

In a further aspect, there is provided a method of operating a gas turbine engine combustor liner having at least one monolithic ceramic block having a first face and a second face opposite the first face, and a 3D fabric of ceramic fibers partially embedded inside the monolithic ceramic block, and partially extending outside the second face of the monolithic ceramic block, away from the combustion chamber, the method comprising exposing the first face of the monolithic ceramic block to combustion.

DESCRIPTION OF THE DRAWINGS

Reference is now made to the accompanying figures in which:

FIG. 1 is a schematic axial cross-sectional view of a gas turbine engine;

FIG. 2 is a schematic axial cross-sectional view of a portion of a combustor liner;

FIG. 3 is a plan view of a portion of a combustor liner;

FIG. 4 is a cross-sectional view of a portion of a combustor liner schematically representing examples of potential slot shapes;

FIG. 5 is a transversal cross-sectional view of an example combustor liner;

FIG. 6 is a schematic cross-sectional view illustrating a possible fabrication process for a combustor liner;

FIG. 7 is a schematic cross sectional view of another example of a combustor liner;

FIG. 8 is an oblique view of an example portion of a combustor liner formed with a plurality of portions such as shown in FIG. 7;

FIG. 9 is an oblique view of another example configuration of a combustor liner;

FIG. 10A to 10D illustrate a plurality of examples of ways to connect structural elements end to end;

FIG. 12 and FIG. 13 show two additional example ways of holding structural elements to one another.

DETAILED DESCRIPTION

Figure 11B:
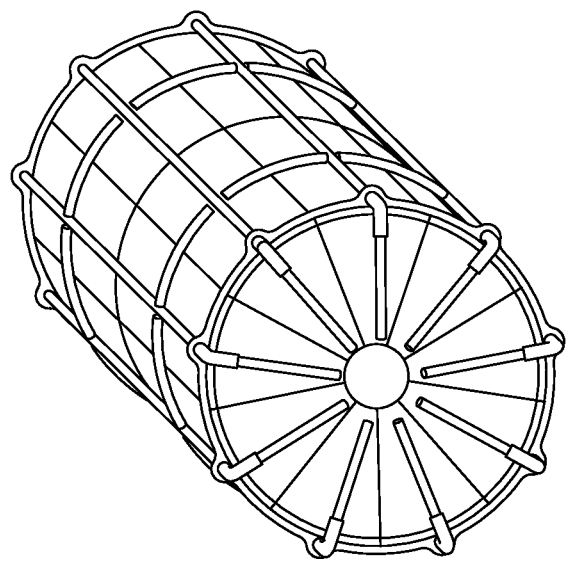
FIGS. 11A and 11B show two additional example configurations of a combustor liner.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor section 16 in which the compressed air is mixed with fuel and ignited for generating an annular stream of hot combustion gases, and a turbine section 18 for extracting energy from the combustion gases. Depending on the embodiment, the combustor section 16 can have a single annular combustor liner 20, or a plurality of individual combustor liners 20 circumferentially interspaced from one another around the main axis 11, to name two examples. One or more compressed air flow path 22 can extend outside the combustor liner 20, whereas the combustion chamber 24 can be inside the combustor liner 20. Combustion occurs at least mainly inside the combustion chamber 24, based on a continuous supply of compressed air circulated across the combustor liner 20. In this context, the compressed air flow path(s) 22 can be referred to as cooling path(s) even though, in practice, the temperature of the compressed air can be significantly higher than standard atmospheric temperature.

It is frequent for the combustor to include one liner 20, or a plurality of distinct liners 20, positioned within a casing 26. The liner 20 can be apertured, in a manner for compressed air to travel first between the casing 26 and the liner 20, and then into the combustion chamber 24, inside the liner 20, through the liner apertures, where the combustion ultimately occurs. One or more fuel nozzle is typically assembled in a manner to spray fuel into the combustion chamber 24, and an igniter is typically used to start the combustion at the beginning of the engine mission, after which combustion can be self-sustained. The liner 20 can be designed and built to withstand extended high temperature cycles.

One approach to liner design is to use a superalloys, which can be expensive. Another approach is to use a ceramic matrix composite (CMC). In a CMC, fibers can be enclosed in a matrix over an entire thickness of the wall. A ceramic protective coating can be added on the CMC face that is exposed to the hot gases, but such a protective coating may be subjected to eventual spallation, or peel-off from the CMC. Without coating protection, fiber damage, delamination, oxidation, and changes in the CMC microstructures may lead to embrittlement on the hot side (combustion chamber side) which can result in creation of material discontinuities and loss, and affect liner function. Cooling of the liner can be used to maintain the composite and fibers within acceptable temperatures, but this can trigger the need for high CMC material conductivity. Silicon carbide based composites are often used in aerospace applications, in part due to their higher thermal conductivity. These materials are sensitive to oxidation, especially in the presence of water vapor, which can be addressed to a certain extent with protective coatings.

It was found that another approach could provide a suitable alternative, and even perhaps be considered preferable for at least some embodiments. Such an other approach will now be presented, and can use monolithic ceramic in a creative way.

Indeed, monolithic ceramic can be considered unsuitable for a liner application, since past certain dimensions, monolithic ceramic may crack upon thermal growth, and therefore break off. Incorporating rigid structural members into a monolithic ceramic block at the time of fabrication may not work to avoid the inconveniences of ceramic block breakage, because there can be a thermal expansion mismatch between the structural members and the ceramic block which may lead to an even greater amount of breakage.

It was found that such inconveniences could be addressed and alleviated by using a 3D fabric of ceramic fibers 28 in combination with one or more monolithic ceramic blocks 30. Referring to FIG. 2 for one possible example, the 3D fabric of ceramic fibers 28 can have fibers partially incorporated into the monolithic ceramic block 30 during manufacture, and partially left with free fiber portions extending outside the monolithic ceramic block 30, on one of the two sides of the monolithic ceramic block, the cold side, or cooling flow path 22. The individual portions of the fibers which extend outside the monolithic ceramic block 30 can be referred to as the free fiber portions. The free fiber portions 32 can thus lead to fixed fiber portions which extend and penetrate into a portion of the monolithic ceramic block 30 in a manner to form an open ended loop 40 attached to the monolithic ceramic block at both ends. The portion of the monolithic ceramic block in which the ceramic fibers extend into the ceramic matrix can be referred to as a composite portion 34. Another portion of the monolithic ceramic block 30 adjacent the hot side (combustion chamber 24), can be left free from the ceramic fibers of the 3D fabric 28 and be referred to as the fiber free portion 36, but this is optional and in some embodiments it can be preferred for the fibers to penetrate into the full thickness of the monolithic ceramic block. Accordingly, if the monolithic ceramic block cracks across its thickness, forming a crack 38, the loops 40 extending across the crack 38 will maintain the two resulting portions of the ceramic block 30 held to one another. The exposed ceramic fibers 32 are on the cold side, and can thus be less exposed to the intense combustion heat than the monolithic ceramic block 30 which is exposed on the hot side.

Indeed, in an embodiment, no fiber damage or delamination will occur on the hot gas side, owing to the fact that a high-temperature, monolithic ceramic shell 30 faces the hot gases, rather than a composite material. The free fibers 32 are maintained at lower temperature, and can be hidden behind a significant thickness of monolithic ceramic. An oxidation resistant material can be selected for the monolithic ceramic block 30, which can do away with the need to have a protective coating, leaving behind potential coating adhesion issues. Moreover, the intrinsic brittleness and potential cracking of the monolithic ceramic block (shell) can be tolerated because of the way it is held in place by the 3D fabric.

This tolerance to shell cracking opens the door to using cheaper and potentially more environment friendly oxide ceramics for making durable combustor liners 20. Ceramics with higher temperature resistance and better chemical stability can be selected at the expense of strength and thermal conductivity, resulting in stable, durable combustor liners at potentially cheaper cost. Higher temperature resistance can also allow for saving cooling air flows in gas turbine engines, hence improving engine performance and reducing polluting emissions.

As perfect sealing if not required in a combustion chamber, it is possible to use a relatively light, reinforced 3D fabric to hold the ceramic "blocks" together as opposed to a metallic casing.

An oxidation resistant ceramic material may be selected for the 3D fabric 28 and the monolithic shell 30. Alternately, a material with lower resistance to oxidation may be used for the monolithic shell 30, with an oxidation resistant coating and sufficient cooling flow and pressure are available to purge any cracks that expose the base material during operation. The fiber of the 3D fabric should be designed to resist oxidation at the temperature that it reaches on the back side of the monolithic shell 30, to make sure that it will maintain its supporting function for a long time. To this end, the ceramic fibers can be made of an oxide ceramic, such as of alumina ceramic, aluminum trioxide, titanium dioxide, silicon oxide, zirconium dioxide, or a mixture thereof (see for instance ceramic fibers manufactured under the trademark Nextel owned by 3M). Another example of a potential material for ceramic fibers 28 is mullite. The monolithic shell 30 can be made of any suitable type of ceramic material, and in some embodiments, it can be suitable to make it of CMC for instance.

In some embodiments, under high temperature operation, in the composite layer 34, the fibers 28 and the base material of the ceramic block 30 may combine and sinter together. This may occur only over a portion of the thickness of the composite layer 34, or along the entire thickness of the composite layer 34. The function of the liner is still maintained in this case, the monolithic ceramic block 30 still being held in place by the free portion 32 of the 3D fabric. The monolithic ceramic block 30 can still be allowed to crack following its pre-designed cracking pattern without releasing pieces or compromising the liner integrity.

A gas turbine combustor liner concept can thus include a 3D fabric of oxide ceramic fibers 28 that holds a monolithic oxide ceramic shell 30 which faces the combustion environment 24. The 3D fabric 28 can be partially embedded within a portion of the ceramic shell 30 to locally form a composite layer 34. The remainder of the fabric 28 can be left free 32 and exposed to the cooling air 22 supplied by the engine compressor 14. The free fibers 32 are not exposed to the combustion environment 24 and can thus be maintained at a lower temperature, which may allow using oxide fibers with relatively low max-use temperature.

In one embodiment, on the combustion face 42, the monolithic ceramic shell can exhibits crack initiation features such as slots 44, as shown FIGS. 2-4. These features can be purposely integrated to the design of the part to promote cracking following a desired pattern under the thermal stresses present during combustor operation. Without such features, thermal stresses may make the shell crack in an uncontrolled way, from locations where the monolithic ceramic randomly exhibits defects.

After cracking, the resulting discrete monolithic ceramic blocks, or fragments, can remain held in place by the overlying portion of the fabric that is intrinsically bonded with each of them. The cracks can continuously be purged during operation by cooling air from the cool side of the liner, which can occur naturally due to the positive pressure drop that may exist across the liner, hence preventing leakage of hot combustion gases towards the outside.

Crack-initiating slots 44 may take various profile shapes shape like the few examples shown in FIG. 4, depending on the manufacturing process.

The crack initiating features can extend in a 2D pattern, such as the 2D pattern shown in FIG. 3, or other 2D patterns which may vary from one design to another, depending on predicted stress fields prior to and after cracking or other design criteria. It will be understood, for example, that even though regular squares are shown here, crack initiating features may define strips or rectangles, for example, either regular (repeating size) or not. Curved features can also be suitable in some embodiments.

Alternately, the shell can be comprised of a plurality of monolithic ceramic blocks 30 right from the time of manufacture, and the 3D fabric can extend across the gaps between the monolithic ceramic blocks, for instance.

FIG. 5 shows one potential arrangement into a cylindrical, annular combustor liner 120. In this particular case, crack initiation features are aligned with the axial direction, which forms cracks 142 splitting the monolithic ceramic shell into sectors during operation, under the circumferential stresses. An outer cylindrical liner portion has a monolithic ceramic block shell 130 facing inward to the combustion environment 124, whereas an inner liner portion has a monolithic ceramic block shell 130 facing outward. The free fibers 128 are exposed to the cooling flow 122 Crack initiation features may be provided in the circumferential direction as well, or in any other direction, depending on the design. In a combustor can configuration, the inner cylindrical liner would be absent.

Various fabrication processes may be used, and the ultimate choice can be made as a function of the specific embodiment. In one example, presented at FIG. 6, the 3D fabric can be pressed down into a ceramic slurry, powder or precursor 50 that will be the base material of the monolithic shell before curing and sintering, in which case optional hard stops 52 may be provided in the mold 54 to ensure to maintain the fabric a given distance from the hot face, hence maintaining a desired thickness of the monolithic block fiber free. Such stops may correspond to crack initiation features, for instance. Moreover, instead of being pressed down, the 3D fabric 28 may penetrate the ceramic slurry by gravity, with help of vibrations if necessary, or via centrifugal force using a rotating apparatus to name some examples. In still other examples, the fabrication process may involve spraying a ceramic slurry or ceramic precursors onto the 3D fabric.

Given that the 3D fabric 28 is flexible, supporting/strengthening members/elements can be used to hold it in place under the mechanical and pressure loads after the monolithic ceramic shell is cracked during operation. For instance, FIG. 7 shows an example of a supporting cylindrical rod that is inserted in a location where the fabric links are interrupted in the through-thickness (z) direction. The process of inserting stiff elements 60 in a 3D fabric 28 can consist in modifying the weaving pattern such that the fabric 28 can locally be separated in two plies. The support element 60 is inserted from one end of the resulting opening.

Various arrangements of supporting inserts 60 can be designed depending on the geometry, loads, and proposed cracking patterns on the part. FIG. 8 shows a simple panel arrangement with two rods 60 that prevent folding of the ceramic shell at the discontinuities or crack locations. FIG. 9 shows a more complex cylindrical arrangement where support inserts are provided in the two main directions, with the monolithic ceramic shell facing inward. This configuration may serve as a tubular combustion liner and may display variations of radius along its length. A reversed configuration where the monolithic ceramic shell faces outward is also possible and may act as the inner liner of an annular combustion chamber, to name yet another possible example.

The support elements 60 may take any shape different than rods: plates, complex shapes, etc., and still be insertable in the 3D fabric.

The support elements 60 can also serve to attach the combustor liner within the engine assembly, which may be achieved by providing some holes, threads, fasteners, etc. in or with those support elements. They could also serve to link one combustor part to another in a combustor assembly.

In a variation of the tubular combustion chamber configuration of FIG. 9, the 3D fabric may be woven flat and then rolled into a cylinder, with support elements joining the two extremities together. The cylindrical combustor may also be an assembly of sectors and/or axial slices.

Figure 11A:
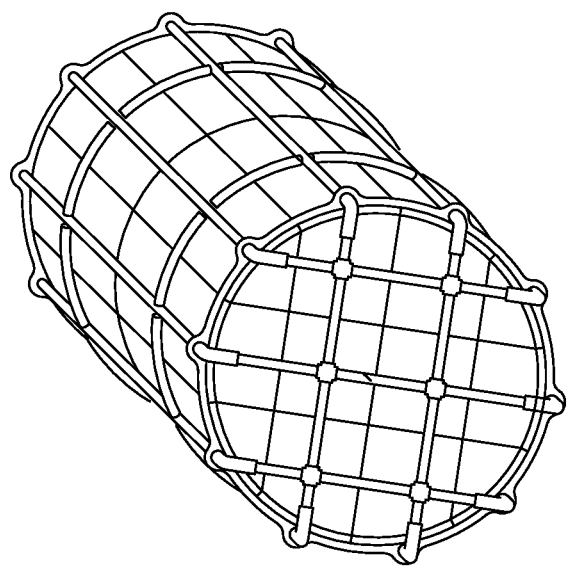

Various means may be used to link supporting elements together. Some examples are shown in FIGS. 10A to 10D for joining extremities 62 with sleeves 64 or the like. Parts may also be assembled at an angle as shown in FIG. 13. FIG. 11A and FIG. 11B show possible installations of a lid at one extremity of the cylindrical arrangement proposed earlier. This kind of assembly can be used to close the upstream end of a tubular combustion chamber. A similar arrangement could be considered for an annular combustion chamber. FIG. 12 shows an example where plate extremities 70 are held by a linking plate 72, via studs and nuts 74.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, instead of one single part containing one fiber assembly and a ceramic shell that is expected to crack at specific locations, one could decide to use multiple parts, each containing its own piece of fabric and ceramic shell, assembled together by some means including the ones described above. If small enough, every part of the assembly may be able to withstand the thermal stresses without cracking. The concept could be used in applications other than a combustion chamber, e.g.: Fire or heat protection panels or devices, Furnace equipment, Heat shields for high-speed aircraft or missiles. Yet further modifications could be implemented by a person of ordinary skill in the art in view of the present disclosure, which modifications would be within the scope of the present technology.

The invention claimed is:

1. A combustor liner delimiting a combustion chamber for a gas turbine, the combustor liner comprising:
    at least one monolithic ceramic block having a first face exposed to the combustion chamber and a second face opposite the first face, and
    a 3D fabric of ceramic fibers extending from a first fabric face to a second fabric face opposite the first fabric face, the 3D fabric of ceramic fibers having an embedded portion embedded inside the at least one monolithic ceramic block and having a free fiber portion extending outside the second face of the monolithic ceramic block, away from the combustion chamber, the first fabric face embedded inside the monolithic ceramic block, the second fabric face located outside the monolithic ceramic block, the free fiber portion being free of the at least one monolithic ceramic block, a ceramic fiber of the ceramic fibers extending from within the at least one monolithic ceramic block to outside of the at least one monolithic ceramic block across the second face of the at least one monolithic ceramic block.

2. The combustor liner of claim 1 further comprising at least one slot formed in the first face of the monolithic ceramic block, the at least one slot being configured to initiate cracking, wherein the ceramic fibers extending outside the second face bridge a thickness-wise projection of the at least one slot.

3. The combustor liner of claim 1 further comprising at least one crack formed across a thickness of the at least one monolithic ceramic block, and extending from the first face to the second face, and delimiting two fractions of the at least one monolithic ceramic block, wherein the ceramic fibers extending outside the second face bridge the two fractions of the at least one monolithic ceramic block to one another and hold them together.

4. The combustor liner of claim 1 comprising at least two of said at least one monolithic ceramic block, wherein the ceramic fibers extending outside the second face bridge the at least two of said at least one monolithic ceramic block to one another and hold them together.

5. The combustor liner of claim 1 further comprising a 2D pattern of slots formed in the first face of the at least one monolithic ceramic block, the slots intersecting one another in the 2D pattern.

6. The combustor liner of claim 1 further comprising a support element extending alongside the second face and snugly engaged within a portion of the ceramic fibers extending outside the second face.

7. The combustor liner of claim 1 wherein the ceramic fibers are made of an oxide ceramic material.

8. The combustor liner of claim 1 wherein the ceramic fibers are composed of one of alumina, titanium dioxide, silicon oxide, zirconium dioxide, mullite, and a mixture thereof.

9. The combustor liner of claim 1 wherein the combustor liner extends annularly, and the first face forms a radially outer delimitation to the combustion chamber.

10. The combustor liner of claim 1 wherein the combustor liner extends annularly, and the first face forms a radially inner delimitation to the combustion chamber.

11. A gas turbine engine comprising, in serial flow communication, a compressor section, a combustor section, and a turbine section, the combustor section comprising
a combustor liner having:
at least one monolithic ceramic block having a first face exposed to a combustion chamber and a second face opposite the first face, and
a 3D fabric of ceramic fibers extending from a first fabric face to a second fabric face opposite the first fabric face, the 3D fabric of ceramic fibers having an embedded portion embedded inside the at least one monolithic ceramic block and having a free fiber portion extending outside the second face of the monolithic ceramic block, away from the combustion chamber, the first fabric face embedded inside the monolithic ceramic block, the second fabric face located outside the monolithic ceramic block, the free fiber portion being free of the at least one monolithic ceramic block, a ceramic fiber of the ceramic fibers extending from within the at least one monolithic ceramic block to outside of the at least one monolithic ceramic block across the second face of the at least one monolithic ceramic block; and
the combustor section further comprising a cooling flow path extending alongside the second face.

12. The gas turbine engine of claim 11 wherein the cooling flow path extends between the combustor liner and a casing of the combustor section.

13. The gas turbine engine of claim 11 further comprising at least one crack formed across a thickness of the at least one monolithic ceramic block, and extending from the first face to the second face, and delimiting two fractions of the at least one monolithic ceramic block, wherein the ceramic fibers extending outside the second face bridge the two fractions of the at least one monolithic ceramic block to one another and hold them together.

14. The gas turbine engine of claim 11 further comprising a support element extending alongside the second face and snugly engaged within a portion of the ceramic fibers extending outside the second face.

15. The gas turbine engine of claim 11 wherein the ceramic fibers are made of an oxide ceramic material.

16. The gas turbine engine of claim 11 wherein the ceramic fibers are composed of one of alumina, titanium dioxide, silicon oxide, zirconium dioxide, mullite, and a mixture thereof.

17. The gas turbine engine of claim 11 wherein the combustor liner extends annularly, and the at least one monolithic ceramic block is configured in a manner that the first face thereof forms a radially outer delimitation to the combustion chamber or a radially inner delimitation to the combustion chamber.

18. A method of operating a gas turbine engine combustor liner having at least one monolithic ceramic block having a first face and a second face opposite the first face, and a 3D fabric of ceramic fibers extending from a first fabric face to a second fabric face opposite the first fabric face, the 3D fabric of ceramic fibers having an embedded portion embedded inside the at least one monolithic ceramic block and having a free fiber portion extending outside the second face of the at least one monolithic ceramic block, away from the combustion chamber, and being free of the at least one monolithic ceramic block, the first fabric face embedded inside the at least one monolithic ceramic block, the second fabric face located outside the at least one monolithic ceramic block, a ceramic fiber of the ceramic fibers extending from within the at least one monolithic ceramic block to outside of the at least one monolithic ceramic block across the second face of the at least one monolithic ceramic block, the method comprising exposing the first face of the at least one monolithic ceramic block to combustion.

19. The method of claim 18 further comprising exposing a portion of the ceramic fibers extending outside the second face to a cooling flow.

20. The method of claim 19 further comprising a crack extending across a thickness of the at least one monolithic ceramic block, between the first face and the second face, the method further comprising sustaining a positive pressure difference between the first face and the second face, and thereby purging the crack by a portion of said cooling flow extending from the second face to the first face across the crack.

* * * * *